United States Patent
Butterworth

(10) Patent No.: US 7,518,651 B2
(45) Date of Patent: Apr. 14, 2009

(54) MULTIPLE IMAGE AUTOFOCUS

(75) Inventor: Mark M. Butterworth, Santa Clara, CA (US)

(73) Assignee: Aptina Imaging Corporation, Grand Cayman (KY)

(*) Notice: Subject to any disclaimer, the term of this patent is extended or adjusted under 35 U.S.C. 154(b) by 757 days.

(21) Appl. No.: 10/857,050

(22) Filed: May 28, 2004

(65) Prior Publication Data

US 2005/0264678 A1    Dec. 1, 2005

(51) Int. Cl.
  *G03B 13/00* (2006.01)
  *H04N 5/232* (2006.01)
(52) U.S. Cl. ..................... 348/345; 348/349
(58) Field of Classification Search ......... 348/345–349; 396/77–82; 359/698–706
See application file for complete search history.

(56) References Cited

U.S. PATENT DOCUMENTS

| | | | | |
|---|---|---|---|---|
| 5,369,461 A * | 11/1994 | Hirasawa et al. | ............. | 396/135 |
| 6,522,480 B2 * | 2/2003 | Nakamura | .................... | 359/698 |
| 6,683,651 B1 * | 1/2004 | Motta et al. | .................. | 348/345 |
| 6,693,672 B1 * | 2/2004 | Oliver | ......................... | 348/345 |
| 7,102,681 B1 * | 9/2006 | Kashiyama | ................. | 348/353 |
| 7,118,222 B2 * | 10/2006 | Kitabayashi | ................. | 353/52 |
| 7,196,729 B2 * | 3/2007 | Sasaki | ......................... | 348/345 |
| 7,242,434 B2 * | 7/2007 | Sugimoto et al. | ........... | 348/349 |
| 7,248,301 B2 * | 7/2007 | Voss et al. | ................... | 348/346 |
| 7,304,681 B2 * | 12/2007 | Larner et al. | ................. | 348/352 |
| 7,307,662 B2 * | 12/2007 | Yoshida et al. | .............. | 348/349 |
| 2002/0191098 A1 * | 12/2002 | Oshima | ....................... | 348/345 |
| 2004/0036795 A1 * | 2/2004 | Fujii et al. | ................... | 348/349 |
| 2004/0042668 A1 * | 3/2004 | Kaplinsky et al. | ............ | 382/232 |
| 2004/0223073 A1 * | 11/2004 | Kanai | .......................... | 348/345 |

OTHER PUBLICATIONS

Translated Drawings of Fujii et al. (U.S. Pub No.: 2004/0036795A1).*

* cited by examiner

*Primary Examiner*—David L Ometz
*Assistant Examiner*—Pritham Prabhakher
(74) *Attorney, Agent, or Firm*—Ratner Prestia

(57) ABSTRACT

A camera provides an autofocus function by capturing a series of images when a lens is at different positions, analyzing the images to identify a best-focused image, and outputting the best-focused image. Unselected images can be discarded. The camera can include a FIFO buffer that receives image data from an image sensor as the image sensor captures images. When a photographer activates a shutter button, an analysis system, which may be implemented in software, analyzes the images in the FIFO buffer and selects the best-focused image for output. In alternative embodiments, the movement of the lens and the capture of the images can be before or in response to activation of the shutter button.

20 Claims, 2 Drawing Sheets

MULTIPLE IMAGE AUTOFOCUS

BACKGROUND

Taking clear and sharp photographs generally requires focusing the lens of a camera on the object being photographed. Traditionally, the photographer manually focuses the camera lens for the photograph being taken, so that an image of the object lies on the plane of the film or image sensor that captures the image. This manual focusing can take some time and skill. Accordingly, cameras with autofocusing have been developed to simplify photography.

FIG. 1 schematically illustrates a digital camera 100 containing a known autofocus system. Camera 100 includes a lens 110 that is mounted on a drive mechanism 115 capable of changing the distance between lens 110 and an image sensor 120, and a motor 130 under the control of a controller 140 moves lens 110 for focusing on a target object. A pulse generator 135 measures the rotation of motor 130 and generates a pulse signal that controller 140 can use for tracking movement of lens 110. For autofocusing, a range finder 150 that receives light through lens 110 determines a distance between an image plane of lens 110 and the plane of image sensor 120. Range finding may, for example, be implemented using known phase difference detection techniques. Controller 140 receives the distance determined in range finder 150 and activates motor 130 to move lens 110 the distance required to place the image plane of lens 110 on image sensor 120. When lens 110 is properly focused and the photographer operates the shutter button of camera 100, image sensor 120 captures the image, which can be digitally stored in a memory 160.

The autofocus system described above generally adds to the cost of camera 100. In particular, camera 100 requires specific components such as range finder 150 with associated optics (not shown) and pulse generator 135 that may only be used for autofocusing. Additionally, motor 130 and drive mechanism 115 must be able to move lens 110 a controlled distance in either direction, and a relatively expensive stepper motor or voice coil motor may be required for adequate control of drive mechanism 115.

An autofocus system is desired that can reduce camera cost and/or size through reduction of the number and cost of autofocusing components.

SUMMARY

In accordance with an aspect of the invention, an autofocus system in a digital camera captures a series of images corresponding to a series of positions of a camera lens. The series of images can be digitally analyzed to identify which of the images is best focused, and the best-focused image is kept when a photographer takes a photograph. The other images can be discarded. A focusing mechanism of the camera lens can move the lens through the series of positions and no longer requires a range finder, a pulse generator, or a system that can move the lens to a pre-identified target position.

In one mode of operation, a camera continuously captures images and stores image data temporarily in a FIFO buffer. When a photographer snaps a shutter button for the camera, a processor in the camera analyzes the images in the FIFO buffer and stores the best-focused image in an image memory. Otherwise, digital images in the FIFO buffer are sequentially discarded as new images are captured.

One specific embodiment of the invention is a photography process. The photography process includes: moving the focus of a lens to a series of positions; operating an image sensor to capture images respectively at the positions; analyzing the images to identify a best-focused image; and saving the best-focused image as a captured photograph. Moving the lens can be in response to activation of a shutter button or can be continuous when a camera is in a mode ready for capturing a photograph. With continuous lens motion, the image sensor can repeatedly capture new images and store image data in a FIFO buffer. The image data in the FIFO buffer can be analyzed when a photographer activates a shutter button or discarded to make room for new image data when the FIFO buffer is full.

Another specific embodiment of the invention is a camera including an image sensor; a lens; a lens drive system, and a selection system. The lens drive system is capable of moving focus of the lens relative to the image sensor and is operable while the image sensor captures a series of images. When a photograph is taken, the selection system, which can be implemented in software, analyzes image data from the image sensor, selects a best focused image from among the series of images, and outputs the best-focused image as an output photograph. A buffer such as a FIFO buffer can receive image data from the image sensor and provide image data to the selection system for analysis and selection when capture of a photograph is desired. The lens drive system for the camera can employ an inexpensive DC motor and does not require the ability to seek to a specific lens position.

BRIEF DESCRIPTION OF THE DRAWINGS

Use of the same reference symbols in different figures indicates similar or identical items.

DETAILED DESCRIPTION

In accordance with an aspect of the invention, a camera captures a series of images corresponding to a series of lens positions and then selects the best of the images to be kept when a photographer captures an image. A lens positioning system for the camera moves the lenses through the series of positions but does not need the capability to seek a specific lens position or to move a specific distance in response to a focus or range measurement, and the camera does not require specialized range finding hardware. Further, the autofocusing process can reduce delays in picture taking since a picture can be captured even before the focused location of the lens is known.

Figure 1:
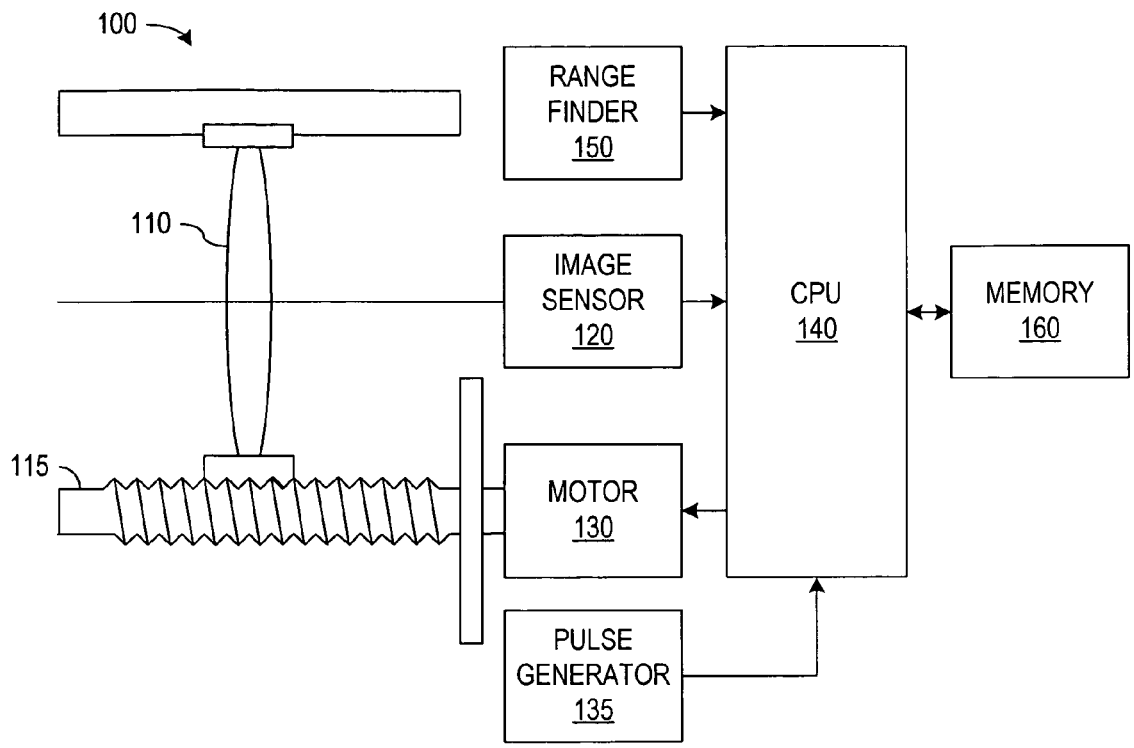
FIG. 1 is a block diagram of a camera containing a known auto-focus system.
Figure 2:
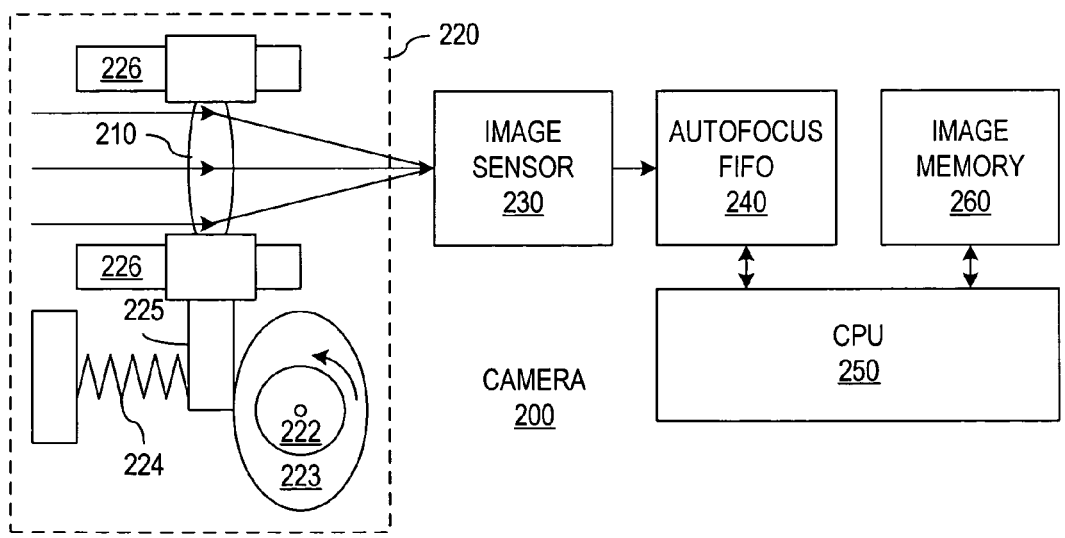
FIG. 2 is a block diagram of a camera in accordance with an embodiment of the invention having an auto-focus system with a motor drive.

FIG. 2 illustrates a digital camera 200 in accordance with an embodiment of the invention. Camera 200 includes a lens 210 mounted in a drive mechanism 220 that moves the focus of lens 210 relative to an image sensor 230. Lens 210 can be any type of conventional camera lens capable of forming an image on image sensor 230, and drive mechanism 220 preferably provides a range of motion for lens 210 that permits lens 210 to form an image on image sensor of an object at any distance greater than about 50 mm.

In an auto-focusing process for camera 200, drive mechanism 220 moves lens 210 through the range of motion of drive mechanism 222 while image sensor 230 captures a series of images. The movement of lens 210 can be continuous while the series of images are captured. Generally, continuous motion of the lens will not produce noticeable effects on the image if lens 210 moves only a negligible distance during the exposure time. However, lens 210 can alternatively be move in short steps if movement of the lens must be avoided during image exposure.

A first-in first-out (FIFO) buffer 240 temporarily stores the image data from image sensor 230. Generally, most of the images in FIFO buffer 240 may be out of focus because lens 210 not at the ideal position when the image is taken. However, images taken will be sharp when lens 210 is at or near the ideal position for focusing on the object being photographed. The sharp images will generally show details such as well-defined edges and textures of the object being photographed. In images that are out of focus, the details of the object will be blurred. A processor 250 in camera 200 can analyze the images in FIFO buffer 240 to identify an image having the sharpest contrast, indicating the best focused image. For example, processor 250 can evaluated the standard deviation of all pixel values for each image and select the image having the largest standard deviation as the sharpest image. The image with the sharpest focus can then be stored in image memory 260.

In an exemplary embodiment of the invention, drive mechanism 220 is able to move lens 210 once through its full range of motion (either away from or toward image sensor 240) in about 100 to 500 ms, and image sensor 240 captures images at a frame rate of about 5 to 30 frames (or images) per second. One traversal of the range of motion of lens 210 thus provides about 5 to 20 images at different focus adjustments, and FIFO buffer 240 has sufficient capacity to store all the images. Processor 250 can then select the best focused of the images in FIFO buffer 240.

Drive mechanism 220 in the embodiment illustrated in FIG. 2 includes a drive motor 222 that rotates a cam 223. Motor 222 is preferably an inexpensive DC motor that continuously rotates cam 223 when activated, but motor can alternatively be a stepper motor that move CAM 223 in steps and stops when each image is captured. A spring mechanism 224 pushes an extending arm of lens barrel 225 against cam 223. Cam 223 in FIG. 2 is elliptical but alternatively can have any radially asymmetric shape about its rotation axis. For example, in one alternative embodiment, a portion of the perimeter of cam 223 can form a spiral or a series of steps each having a different radius.

Lens barrel 225 contains lens 210 and rides on rails 226 that permit lens barrel 225 to slide along a direction parallel to the optical axis of lens 210. The position of lens 210 along rails 226 depends on the radius of cam 223 at the point of cam 223 in contact with lens barrel 225. Since cam 223 is radially asymmetric, continuous rotation of motor 222 thus causes lens 210 to move back and forth through the available range of motion of lens 210.

Motor 222 would generally only be operated when taking of a photograph is anticipated. For example, motor 222 may be activated when a shutter button is depressed to a halfway position. At that point, motor 222 spins, and lens 210 moves while image sensor 230 captures and stores image data for a series of images. The series of images stored in FIFO buffer 240 preferably corresponds to at least one full traversal of the movement range of lens 210 in drive mechanism 220. When the shutter button is fully depressed and FIFO buffer 240 contains a full series of images, processor 250 analyzes the image data in FIFO buffer 240 and selects a best-focused image. The best image is then stored in image memory 260.

Instead of operating motor 220 for a short time when triggered using the shutter button, camera 200 can be operated in a mode where motor 222 spins continuously and image sensor 230 continuously captures images and transfers image data to FIFO buffer 240. Accordingly, the control system for motor 220 can simply be a switch that turns motor 220 when camera enters a ready mode and switches off motor 220 when exiting the ready mode. In the ready mode, when the shutter button is pressed to take a picture, FIFO buffer 240 already contains a full series of images for analysis. Processor 250 can then select an image that was actually captured before activation of the shutter button. No delay for lens movement or other autofocusing processes is required.

Figure 3:
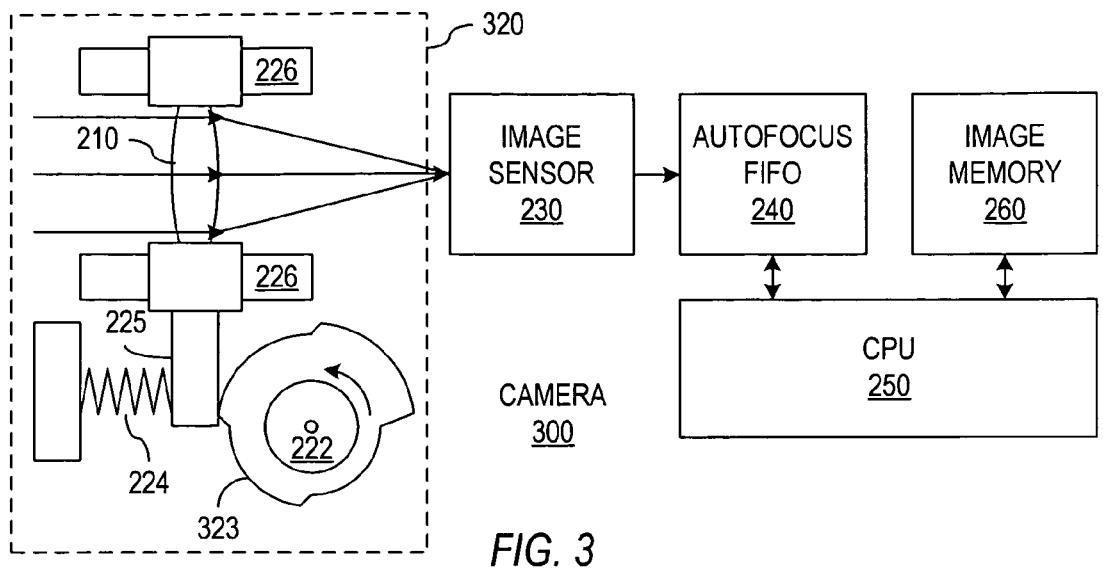
FIG. 3 shows a camera in accordance with an embodiment of the invention having a lens drive system with a stepped cam.

FIG. 3 shows a camera 300 that is the same as camera 200 except that camera 300 has a drive system 320 with a stepped cam 323. In particular, cam 323 has a set of steps, where each step has a different radius. As cam 323 rotates, lens 210 remains stationary while slide mount 225 stays on one of the steps, and lens 210 moves when slide mount 225 transitions from resting on one step to resting on the next step. Image capture operations of image sensor 230 can be synchronized with rotation of cam 323, so that each image is captured when lens 210 is stationary.

Figure 4:
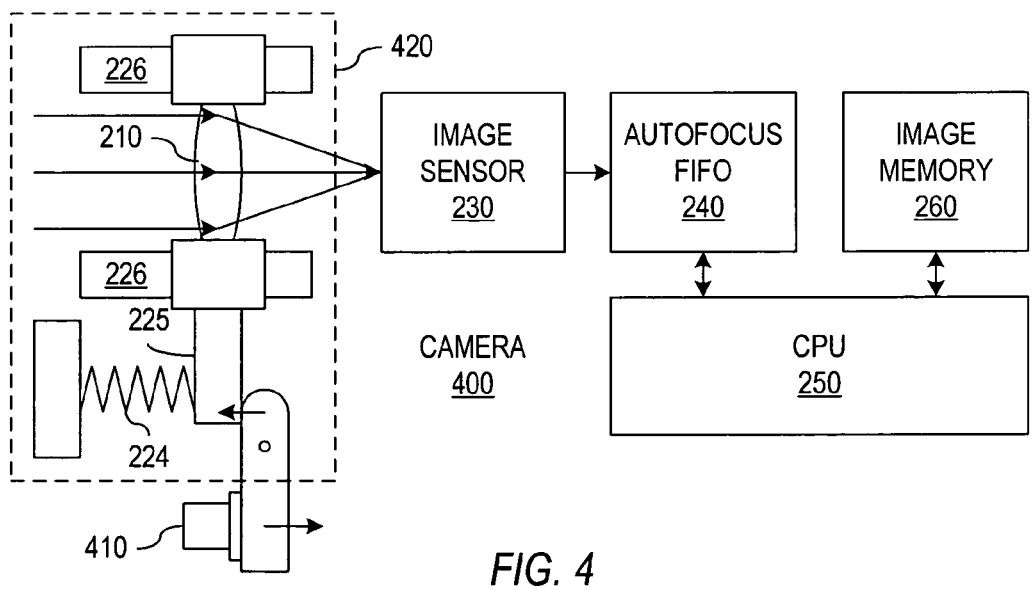
FIG. 4 is a block diagram of a camera in accordance with an embodiment of the invention using a shutter button to drive an auto-focus system.

FIG. 4 shows a camera 400 in accordance with another embodiment of the invention. Camera 400 of FIG. 4 differs from camera 200 of FIG. 2 primarily in employing yet another alternative drive mechanism 420. Drive mechanism 420 does not require a motor and is manually operated, for example, through the operation of a shutter button 410. In particular, as shutter button 410 is depressed, a mechanical system (e.g., a lever) pushes sliding mount 225 along rails 226 so that lens 210 moves from the beginning to the end of its movement range. Image sensor 230 captures a series of images during the movement of lens 210 and stores image data in FIFO buffer 240. Processor 250 can then analyze the images as described above and store the best-focused image in image memory 260.

Although the invention has been described with reference to particular embodiments, the description is only an example of the invention's application and should not be taken as a limitation. Various adaptations and combinations of features of the embodiments disclosed are within the scope of the invention as defined by the following claims.

What is claimed is:

1. A photography process using a lens drive system to change a position of a focus of a lens, comprising:
   moving the focus of the lens in discrete steps to a series of positions relative to an image sensor;
   capturing images respectively taken at the series of positions during an image-capture interval while synchronizing the capturing of the image with the moving of the focus of the lens such that the images are captured while the lens is stationary relative to the image sensor;
   analyzing the captured images to identify a best-focused image; and
   saving the best-focused image,
   wherein the moving of the focus of the lens includes continuously rotating the lens drive system during the image-capture interval to cause the focus of the lens to move in discrete steps relative to the image sensor.

2. The process of claim 1, wherein the moving of the focus of the lens comprises moving the lens in response to activation of a shutter button.

3. The process of claim 1, wherein the moving of the focus of the lens comprises continuously operating a drive motor for a lens drive system on which the lens is mounted.

4. The process of claim 3, wherein the lens drive system moves the lens back and forth through a range of motion while the drive motor operates.

5. The process of claim 3, wherein the analyzing of the captured images is in response to activation of a shutter button.

6. The process of claim 3, wherein the capturing of the images comprises repeatedly capturing a new image and then storing image data in a FIFO buffer, wherein image data that is stored first in the FIFO buffer is discarded to make room for new image data when the FIFO buffer is full.

7. The process of claim 6, wherein the saving of the best-focused image comprises reading from the FIFO buffer image data corresponding to the best-focused image and storing image data corresponding to the best-focused image in a memory.

8. The process of claim 3, wherein the drive motor comprises a DC motor.

9. The process of claim 1, wherein:
the moving of the focus of the lens includes driving the lens using a motor, the motor being operated without stopping during the image-capture interval to cause the movement of the lens in discrete steps during the image-capture interval.

10. A camera comprising:
an image sensor for capturing a series of images during an image-capture interval;
a lens;
a lens drive system for moving a focus of the lens in discrete steps relative to the image sensor during the image-capture interval, the image sensor synchronizing the capturing of the images with the moving of the focus of the lens such that the images are captured while the lens is stationary relative to the image sensor; and
a selection system coupled to the image sensor to analyze image data from the image sensor, for selecting a best-focused image from among the series of images, and for outputting the best-focused image as an output photograph,
wherein the lens drive system includes a cam coupled to a motor for changing the focus of the lens relative to the image sensor, the cam being continuously rotated during the image-capture interval.

11. The camera of claim 10, further comprising a buffer connected to receive image data from the image sensor and connected to provide image data to the selection system for analysis and selection.

12. The camera of claim 11, wherein the buffer comprises a FIFO buffer.

13. The camera of claim 10, wherein the lens drive system comprises:
the motor;
the cam attached to be spun by the motor; and
a sliding lens barrel that rides on the cam.

14. The camera of claim 13, wherein the motor comprises a DC motor that is switched on to operate continuously while the image sensor captures the series of images.

15. The camera of claim 13, further comprising a switch that turns the motor on when the camera enters a ready mode and turns the motor off when the camera exits the ready mode.

16. The camera of claim 10, wherein the lens drive system comprises a mechanical system that responds to movement of a shutter button of the camera to move the lens.

17. The camera of claim 10, wherein the lens drive system comprises a lever that moves the lens as a shutter button of the camera is depressed.

18. The camera of claim 10, wherein the lens drive system includes:
the cam having a camming surface such that a displacement of the lens is controlled based on a rotation angle of the cam, wherein the camming surface includes a plurality of continuous regions such that each continuous region of the camming surface corresponds to a predetermined displacement of the lens, movement between each respective continuous region and a subsequent continuous region of the plurality of continuous regions cause a shift in the displacement of the lens relative to the image sensor.

19. A photography method, comprising:
moving a focus of a lens in a series of discrete steps to a series of positions relative to an image sensor;
capturing images, using the image sensor, while synchronizing the capturing of the image with the moving of the focus of the lens such that the images are captured while the lens is stationary relative to the image sensor, each respective captured image corresponding to a different position of the series of positions;
storing the captured images;
analyzing the stored images to identify a best-focused image; and
deleting the stored images except for the identified best-focused image
wherein the moving of the focus of the lens includes continuously rotating a lens drive system during an image-capture interval to cause the focus of the lens to move in the series of discrete steps relative to the image sensor.

20. The method of claim 19, wherein:
the storing of the captured images includes saving the captured images in a FIFO buffer; and
the deleting of the stored images except for the identified best-focused image includes:
outputting the best-focused image; and
removing the stored images from the FIFO buffer in first in first out sequence as further images are stored by the FIFO buffer.

* * * * *